Patented June 22, 1926.

1,589,390

UNITED STATES PATENT OFFICE.

HEINRICH HERMINGHAUS, OF ELBERFELD, GERMANY, ASSIGNOR, BY MESNE ASSIGNMENTS, TO WINTHROP CHEMICAL COMPANY, INC., OF NEW YORK, N. Y., A CORPORATION OF NEW YORK.

SULPHONATED THIANTHRENES USEFUL AS PHARMACEUTICAL COMPOUNDS.

No Drawing. Application filed May 24, 1924, Serial No. 715,687, and in Germany August 4, 1923.

The present invention relates to the manufacture and production of new sulphonated thianthrenes useful as pharmaceutical compounds. They are obtainable by treating with sulphonating agents, such as sulphuric acid, fuming sulphuric acid, or the chlorohydrin of sulphuric acid, thianthrene and its substituted products or the compounds obtainable according to the United States Letters Patents No. 1,426,430 and No. 1,427,182 at a high temperature until the reaction products may be completely dissolved in water. The products obtainable according to these patents are thick oily liquids, insoluble in water, obtained by treating the homologues of benzene with sulphur and aluminum chloride.

The new products are monosulphonic acids and may be represented by the general formula

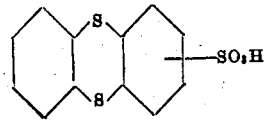

in which the thianthrene nucleus may be substituted or unsubstituted and in which the position of the SO₃H group is undetermined.

The new products are after being dried and pulverized in the form of their alkaline salts generally brownish powders, easily soluble in water with a dark reddish-brown coloration. They show a strong antiphlogistical action and precipitate albumen, when used in a weakly acid solution.

In carrying out the invention practically I can proceed as follows, the parts being by weight:—

1000 parts of dimethylthianthrene are heated with 460 parts of pure sulphuric acid during 8 hours at 100° C. then for 10 hours at 120° C. and finally for 8 hours at 150–160° C. until a test portion is completely soluble in water. The product thus obtained is as hard as glass. It is dissolved in water and this solution is then neutralized with sodium carbonate and evaporated to dryness. The product is after being dried and pulverized a dark brown powder and is capable of precipitating to albumen.

I claim:

1. As a new product a monosulphonated thianthrene the sodium salt of which has a strong antiphlogistical action and in its dry pulverized form is a brownish powder readily soluble in water with a dark reddish-brown coloration.

2. As a new product a dimethyl-thianthrene monosulphonic acid the sodium salt of which has a strong antiphlogistical action and in its dry pulverized form is a dark brown powder.

In testimony whereof I have hereunto set my hand.

HEINRICH HERMINGHAUS.